United States Patent [19]

Greaves et al.

[11] Patent Number: 4,947,436
[45] Date of Patent: Aug. 7, 1990

[54] SPEAKER VERIFICATION USING MEMORY ADDRESS

[75] Inventors: Alan J. Greaves, Ipswich; Paul C. Millar, Felixstowe, both of Great Britain

[73] Assignee: British Telecommunications public limited company, London, England

[21] Appl. No.: 235,896

[22] PCT Filed: Dec. 9, 1987

[86] PCT No.: PCT/GB87/00895
§ 371 Date: Oct. 7, 1988
§ 102(e) Date: Oct. 7, 1988

[87] PCT Pub. No.: WO88/04772
PCT Pub. Date: Jun. 30, 1988

[30] Foreign Application Priority Data

Dec. 17, 1986 [GB] United Kingdom .................. 8630118

[51] Int. Cl.$^5$ .............................................. G10L 5/06
[52] U.S. Cl. .............................................. 381/42
[58] Field of Search ................. 364/513.5; 381/41–43, 381/44–50; 341/54, 107

[56] References Cited

U.S. PATENT DOCUMENTS

| | | | |
|---|---|---|---|
| 3,737,580 | 6/1973 | Poza | 381/42 |
| 4,100,370 | 7/1978 | Suzuki et al. | 381/42 |
| 4,344,031 | 8/1982 | Kuhn et al. | 324/77 R |
| 4,394,538 | 7/1983 | Warren et al. | 381/43 |
| 4,720,863 | 1/1988 | Li et al. | 381/42 |
| 4,752,958 | 6/1988 | Cavazza et al. | 381/42 |
| 4,763,278 | 8/1988 | Rajasekaran et al. | 381/43 |
| 4,776,017 | 10/1988 | Fujimoto | 381/43 |
| 4,783,805 | 11/1988 | Baker et al. | 381/42 |
| 4,797,927 | 1/1989 | Schaire | 381/43 |

OTHER PUBLICATIONS

ICASSP 82, IEEE International Conference of Acoustics, Speech and Signal Processing, Paris, May 3–5, 1982, vol. 3 (IEEE, New York, U.S.), H. Ney et al.: "Speaker Recognition Using a Feature Weighting Technique", pp. 1645–1648.

IEEE ASSP Magazine, vol. 3, No. 4, Oct. 1986 (IEEE, New York, U.S.), D. O'Shaughnessy: "Speaker Recognition", pp. 4–17.

ICASSP 83, IEEE International Conference on Acoustics, Speech and Signal Processing, Boston, Apr. 14–16, 1983, vol. 2, (IEEE, New York, U.S.), K. P. Li et al.: "An Approach to Text-Independent Speaker Recognition with Short Utterences", pp. 555–558.

Instruments and Control Systems, vol. 45, No. 19, Oct. 1972 (Radnor, U.S.), "Automatic Voice Recognition", pp. 29–32.

ICASSP 84, IEEE International Conference on Acoustics, Speech and Signal Processing, San Diego, Mar. 19–21, 1984, vol. 2 (IEEE, New York, U.S.) M. Krasner et al.: "Investigation of Test-Independent Speaker Identification Techniques Under Conditions of Variable Data", pp. 18B.5.1–18B.5.4.

Primary Examiner—Gary V. Harkcom
Assistant Examiner—David D. Knepper
Attorney, Agent, or Firm—Nixon & Vanderhye

[57] ABSTRACT

Speaker verification is performed by converting a spectral analysis of an input speech signal into a digital format. This digital format is sent directly to the address input of memory storage defining the address which contains relevant information pertaining to the actual speech spectrum. After training, each address contains labels defining whether the address is not used, is used by multiple users, or is used by a single user. Actual verification is performed by counting each occurrence of a valid user address during speech input by a speaker and selecting the highest count as indicative of the user who was speaking.

18 Claims, 2 Drawing Sheets

A SPEAKER IDENTIFICATION SYSTEM.

SPEAKER VERIFICATION USING MEMORY ADDRESS

BACKGROUND OF THE INVENTION

The present invention relates to apparatus for speaker identification i.e. for rescognising or verifying the identity of a person whose speech forms the input to the apparatus.

SUMMARY OF THE INVENTION

According to the present invention there is provided an apparatus for speaker identification comprising: means for deriving from each of successive sample periods of speech input thereto a digital word representing the frequency spectrum thereof; a store for storing codewords indicating for each digital word the relative probability of the frequency spectrum corresponding to that word occuring in the speech of known speakers which the apparatus has been trained to identify, the digital word output of the deriving means being connected to address inputs of the store; and control means responsive, during input of speech by a speaker to be identified, to codewords read out from the store to output, in accordance with a predetemined criterion, data indicating which, if any, of the known speakers is deemed to have been identified.

In a preferred arrangement, the apparatus is arranged in operation during a training sequence, for each sample period, as follows:
  (a) If the number of codewords already stored at the addressed location in the store does not exceed a predetermined number-to-store at that location a codeword identifying the speaker whose speech has given rise to the digital word representing that address.
  (b) If the number of codewords already stored at the addressed location in the store exceeds the predetermined number, store at that location a codeword reserved for indication of multiple users.
The predetermined number can be zero.

Thus, the presence of a known speaker's code at any given location indicates that the probability of the corresponding frequency spectrum occuring in the speech of that speaker is high relative to its probability of occurring in the speech of other speakers. The presence of the multi-user code, on the other hand, indicates that the probability of occurrence is not particularly high for any one speaker rather than another.

In practice, prior to initial training, the store will require to be cleared by writing to it a code not used for any other purpose. The presence after training is complete of such a 'not used' code in any location indicates that the probability of the corresponding spectrum occuring in the speech of any of the known users is low.

In a preferred arrangement the control means comprises a respective counter means for each known speaker and is arranged in operation to respond to each codeword read out from the store by incrementing the counter corresponding to the known speaker (if any) indicated by that codeword as having a relatively high probability of being associated with the frequency spectrum corresponding to the address from which the codeword was read, and the predetermined criterion is that the speaker who shall be deemed to be recognised shall be the one whose counter has the highest count.

Brief Description of the Drawings

Some embodiments of the insertion will now be described, by way of example, with reference to the accompanying drawings, in which.

Detailed Description of the Preferred Embodiment

Figure 1:
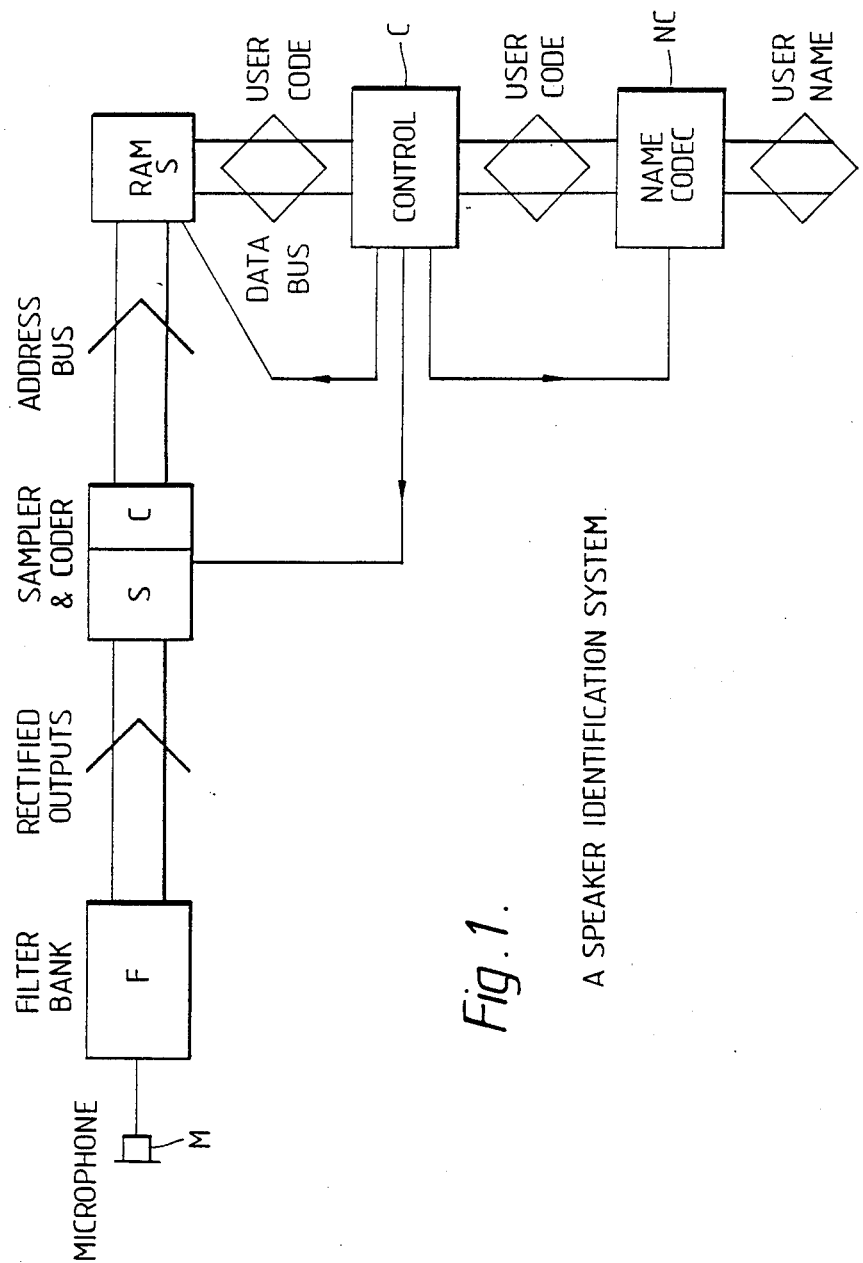
FIG. 1 is a block diagram of one form of apparatus according to the invention.

In FIG. 1, speech signals from a user are input, for example via a microphone M, to a filter bank F to analyse the frequency spectrum of the input speech. Filter outputs representing respective frequency bands are rectified and smoothed and then sampled (S) and coded (C) to together provide the address input to a read-write memory S. For each sample the contents of the address thus accessed may in general contain one of three types of label:
  (a) a 'not used' label—eg all zeros
  (b) a 'multi-user' label—eg all ones
  (c) a 'valid user' label—eg anything other than all zeros or all ones.

Before being used for speaker identification, the apparatus must undergo a training sequence in which each authorised user speaks into the microphone. The object is to record in the store which spectral combinations are peculiar to certain users, and which are not. Thus, in the training mode, the following action is taken for each sample.
  (i) if a 'not used' label is found in the store then the code of the particular user is written into that store location
  (ii) if a 'valid user' label is found and is the same as the current user's code, no action is taken
  (iii) if a 'valid user' label is found and is different from the code of the current user, then a multi-user label is written into that store location
  (iv) if a 'multi-user' label is found, no action is taken.

It will be seen that each store location corresponds to a particular spectral combination. After the training sequence has been completed for a number of users (the 'valid users') each store location contains a label indicating whether the corresponding combination is particular to one authorised user (in which case the label is the user code) or is common to two or more such users, or has been used by none of the authorised users.

Once trained, the apparatus can be used in an identification mode. A user to be identified speaks into the microphone M. If his utterance contains a significant number of spectral combinations known to be unique to one valid user, there is a high probability that the unknown user is that person. Thus the labels found in the store are acted upon as follows:
  (v) if a 'not used' label is found in the store it is ignored
  (vi) if a 'multi-user' label is found it is also ignored
  (vii) if a 'valid usser' label is found, a counter, set aside for that user, is incremented.

At the end of the utterance a count will be held for each of the valid users. The highest count should then indicate which of the valid users has been speaking. Since there will always be at least one highest count, this does not serve to distinguish between valid users on the one hand and unauthorised users on the other. If the object of the recogniser is simply to verify the claimed identity of a user input via a speech recogniser or other means, this may suffice, but preferably the criterion for recognition should be that the highest count should be significantly greater than any other count. Additionally, or instead, it may be required that the highest count exceed a threshold value.

In FIG. 1, it is assumed that the training and identification mode functions are performed by a control unit C. A name codec NC is also shown for translating valid user labels into user names.

Figures 2, 3A, 3B, 3C:
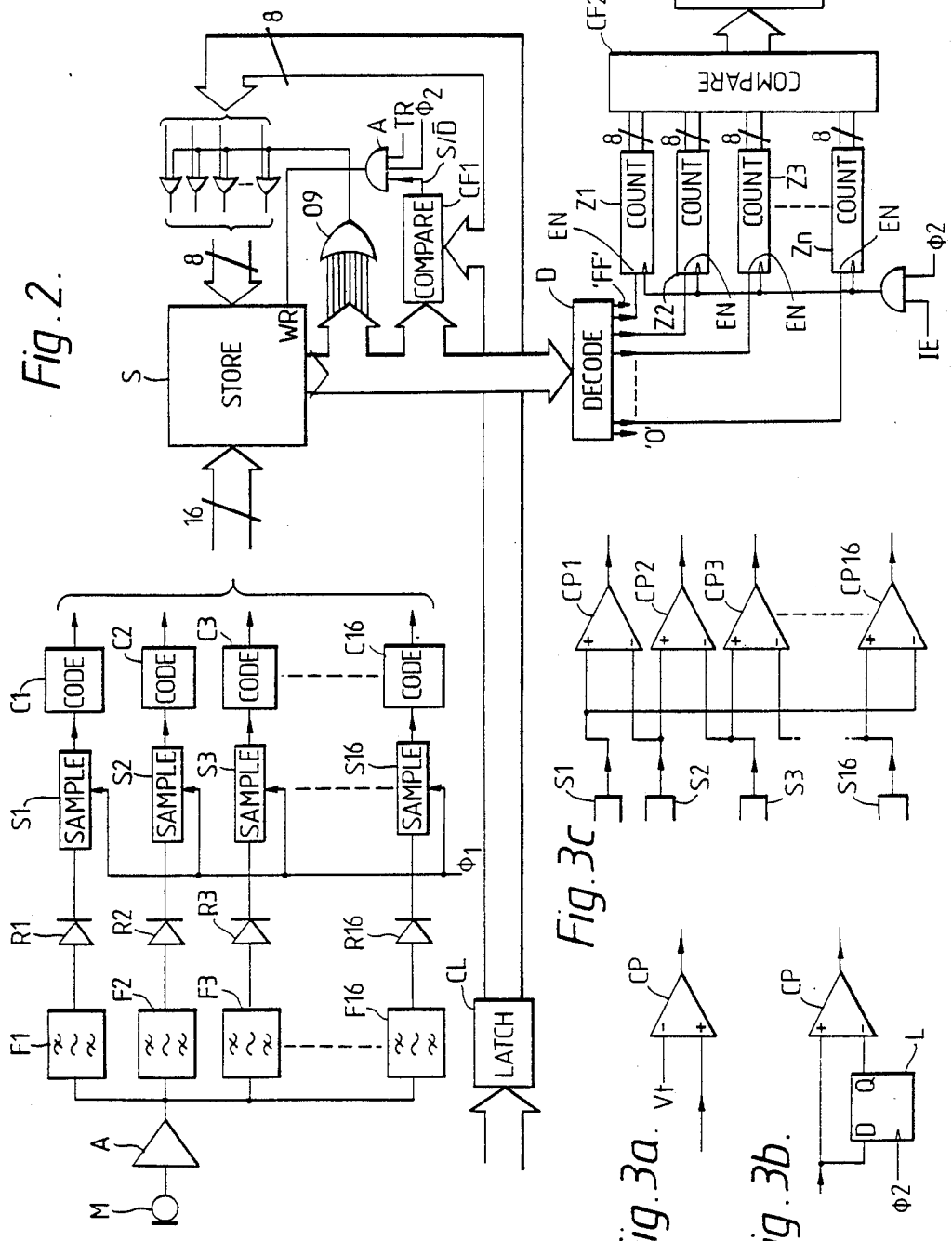
FIG. 2 is a more detailed block diagram of the apparatus of FIG. 1.
FIGS. 3a, 3b and 3c illustrate for the coders shown in FIG. 2.

FIG. 2 shows a practical embodiment of the invention. The microphone M is again shown, followed by a speech amplifier A. The filter bank F comprises sixteen bandpass filters F1 to F16 covering the frequency band from 250 Hz to 5000 Hz. It is preferred that the higher frequency bands are wider than the lower bands—for example in accordance with critical band theory. Rectification and smoothing (with a time constant to suit the following sampler) is illustrated schematically by rectifiers R1–R16.

Sixteen sample and hold circuits S1–S16 are shown, driven by sampling pulses $\phi 1$. It is estimated that a sampling rate of the order of 50 to 100 samples per second will provide satisfactory results, though a higher resolution may be obtained by employing a higher rate- e.g. up to 1000 samples/sec.

Coders C1 to C16 receive the sampled outputs and convert these into a 16-bit word for application to the address inputs of the store S of 64 Kbyte capacity. The coders may simply be comparators CP as illustrated in FIG. 3a which compare the samples with a fixed threshold voltage Vt and produce a '1' or a '0' according to whether the sample is above or below the threshold. However it may be preferred to make the coded outputs independent of the input signal level (which will be dependent on microphone position and amplifier gain) by employing differential coding.

Thus (FIG. 3b) a sample may be compared by a comparator CP with the previous sample delayed in a latch L clocked by pulses $\phi 2$ delayed with respect to the sampling pulses $\phi 1$. Alternatively (FIG. 3c) a sample may be compared with the signal level in an adjacent band (or indeed a non-adjacent band) a '1' being output if (for example) the sample value exceeds that in the frequency band below and a '0' otherwise. The lowest frequency band (F16) can be compared with the highest (F1). If desired both time differential coding and band differential coding might be used—either in parallel (though with a smaller number of bands than that shown since 32 address lines would—at the present time—imply an impractically large memory) or in series, eg by interposing the circuitry of FIG. 3b in the outputs of FIG. 3c (or vice versa).

It should be noted that when using a fixed threshold coding or compared band coding, the sixteen sample and hold circuits are not required. This is because the coded digital word may be continuously presented to the address bus of the RAM, when clocking the RAM will provide the sampling means.

In the training mode, the code for the speaker is entered into an input code latch CL. As the store is addressed, by successive coded samples, the labels output at the (8-bit) data output of the store are compared by a comparator CF1 with the speaker's code. If the two are the same, no action is taken (step (ii) above). If they are different, an AND gate A (enabled by an external signal TR only during training) is enabled to pass to the memory S write pulses $\phi 2$ (delayed sufficiently from $\phi 1$ to allow for the memory read access time, and delays in the coder C and comparator CF1). If the label output from the store is zero, the code from the latch CL passes unhindered via OR gates 01-08 and is written into the memory S (step (i) above). If the label is other than all zeros, this is recognised by an OR gate which, via OR gates 01-08, forces the store input to all ones (FF hex) prior to the write operation, thereby writing (or re-writing) a multi-user label to the store as required by step (iii) (or step (iv)).

For the identification mode, counters Z1 to Zn are provided, one for each valid user. An 8-bit store could permit up to 254 users, but naturally counters need only be provided for the maximum number of valid users for which the system is expected to be trained. For each sample, decoder D recieves the resulting store output data and decodes it to n enable lines, one for each counter. Dummy outputs '0' and 'FF' illustrate steps (v) and (vi) above—ie no action is taken. When (step (vii)) a 'valid user' code appears, the corresponding counter is enabled and incremented by pulse $\phi 2$ menitioned previously.

The counting process continues as long as an identification enabling signal IE is present. This might be generated in response to a signal detector at the amplifier A and have a duration sufficient to permit processing of sufficient samples to achieve reasonable recognition accuracy. From $\frac{1}{2}$ to 3 seconds duration might be typical, with perhaps an 8-bit counter length (i.e. a maximum count of 255).

Once counting is complete, the n 8-bit counter outputs are compared in a comparator CF2. This serves to identify the counter with the highest count and to output the corresponding user code to an output latch OL, though, as discussed above it may serve also to check other criteria before outputting a valid code.

It may be noted that it is not necessary to the operation of the apparatus that the words uttered by speakers to be recognised be the same as those uttered by other speakers; or indeed that they be words previously uttered by that particular speaker during the training mode, provided that the words uttered during the training mode encompass a sufficiently comprehensive range of sounds.

The above described embodiment is only one possible implementation, and various modifications are possible; for example:

rather than invoking the multi-user code when two or more speakers produce the same "sample" during training, this limit may be raised at the expense of a larger memory by allowing the recordal in the store of two (or N) 'valid user' codes against any given store address, the multi-user code being substituted only when three (or N=1) speakers have produced that sample. A retrieval during the identification mode of two valid user codes from one address would then cause both of the corresponding counters to be incremented.

If this option is used, weighting might also be introduced by, for example, incrementing the appropriate counter twice when only a single code appears.

It has been assumed that no action is taken if an "not used" code is retrieved during the identification mode. Since the appearance of this code implies a reduced probability that the user speaking is a valid user, the occurrences of this code might be counted and the result used to weight the recognition process, for example by increasing the threshold which the highest count must meet before recognition is deemed to be complete.

Although functions such as coding, decoding and comparison, have been illustrated in FIG. 2 as performed by dedicated hardware devices, these functions can, if desired, be performed by a suitably programmed microprocessor or other data processing apparatus. Equally, digital filtering could be employed.

We claim:

1. An apparatus for speaker identification comprising:
   means for deriving from each of successive simple periods of speech input thereto a digital word representing the frequency spectrum thereof;
   a store for storing codewords indicating for each digital word the relative probability of the frequency spectrum corresponding to that word occurring in the speech of known speakers which the apparatus has been trained to identify, the digital word output of the deriving means being connected to the address inputs of the store; and
   control means responsive, during input of speech by a speaker to be identified, to codewords read out from the store to output, in accordance with a predetermined criterion, data indicating which, if any, of the known speakers is deemed to have been identified.

2. An apparatus according to claim 1, arranged in operation during a training sequence, for each sample period, as follows:
   (a) if the number of codewords already stored at the addressed location in the store does not exceed a predetermined number, store at that location a codeword identifying the speaker from whose speech the digital word representing that address was derived,
   (b) if the number of codewords already stored at the addressed location in the store exceeds the predetermined number, store at that location a codeword reserved for indicating multiple users.

3. An apparatus according to claim 2 in which the predetermined number is zero.

4. An apparatus according to claim 1, in which the control means comprises a respective counter means for each known speaker and is arranged in operation to respond to each codeword read out from the store by incrementing the counter corresponding to the known speaker (if any) indicated by that codeword as having a relatively high probability of being associated with the frequency spectrum corresponding to the address from which the codeword was read, and in which the predetermined criterion is that the speaker who shall be deemed to be recognised shall be the one whose counter has the highest count.

5. An apparatus according to claim 4 in which the predetermined criterion includes the requirement that identification shall not be deemed to have occurred unless the said highest count exceeds the counts of the other counter by a set margin.

6. An apparatus according to claim 4 in which predetermined criterion includes the requirement that identification shall not be deemed to have occurred unless the said highest count exceeds a threshold value.

7. An apparatus according to claim 6 in which the control means contain a further counter, wherein the control means is responsive to the occurence of a codeword indicating a low probability of any known speaker, to increment the further counter, and is responsive to the content of the further counter to adjust the said threshold value.

8. An apparatus according to claim 6 in which said characteristic feature is the frequency spectrum of the input and in which deriving means comprises:
   filter means for dividing the frequency spectrum of the speech input into a plurality of frequency band outputs,
   means for measuring the average amplitude of, and sampling those outputs, and
   coding means for obtaining the digital word from the resulting samples.

9. An apparartus according to claim 8 in which the coding means is arranged for each band to compare each sample with a threshold value and produce a '1' or '0' signal in dependence thereon.

10. An apparatus according to claim 8 in which the coding means is arranged for each band to compare each sample with the previous sample obtained for that band and produce a '1' or '0' signal in dependence thereon.

11. An apparatus according to claim 8 in which the coding means is arranged for each band to compare each sample with the sample obtained for another band and produce a '1' or '0' signal in dependence thereon.

12. An apparatus for receiving spoken input and for recognizing or verifying the identity of the speaker comprising:
   means for deriving from each of a succession of sample periods of speech input a digital representing the frequency spectrum of the input,
   means for storing a pluurality of codewords, each codeword indicating for each said digital word the relative probability of the frequency spectrum of said digital word occurring in the speech of known speakers,
   means for addressing said means for storing codewords,
   means for connecting the digital word output from said means for deriving to said means for addressing, and
   control means responsive to codewords accessed by said means for addressing to control the production of data in accordance with a predetermined criterion, said data indicating which, if any, speaker is identified,
   said control means being responsive when the apparatus is receiving spoken input.

13. A method for identifying the speaker of an unknown input speech signal as one of a group of previously identified speakers, said method comprising:
   storing in a random access memory stored codewords uniquely corresponding to said previously identified speakers at address locations corresponing to the input speech's frequency spectrum, previously supplied by such speakers, a given one of said codewords being supplied at a memory output in response to input address signals;
   applying to said memory a succession of addresses corresponding to the frequency spectrum of the unknown input speech signal; and
   identifying the speaker of the unknown input speech signal as a function of the resulting succession of codewords output from the memory if said speaker is contained in the group of previously identified speakers.

14. A method for receiving spoken input and for recognizing the identity of the speaker comprising the steps of:

deriving from each of a succession of input speech samples a digital word representing the frequency spectrum thereof;

storing a plurality of codewords in a memory device, each codeword indicating for each said digital word the relative probability of the frequency spectrum of said digital word occurring in the speech of known speakers;

connecting the derived digital words to the addressing circuits of said memory device;

obtaining a succession of codewords accessed by said addressing circuits; and using said succession of codewords, in accordance with a predetermined criterion, to indicate which, if any, speaker is identified.

15. An apparatus for speaker identification comprising:

means for deriving from each of successive sample periods of speech input thereto a digital word representing a characteristic feature of the input;

a store for storing codewords indicating for each digital word the relative probability of the charateristic feature corresponding to that word occurring in the speech of known speakers which the apparatus has been trained to identify, the digital word output of the deriving means being connected to the address inputs of the store;

control means responsive, during input of speech by a speaker to be identified, to codewords read out from the store to output, in accordance with a predetermined criterion, data indicating which, if any, of the known speakers is deemed to have been identified; and wherein said control means includes a respective counter means for each known speaker and is arranged in operation to respond to each codeword read out from the store by incrementing the counter corresponding to the known speaker (if any) indicated by that codeword as having a relatively high probability of being associated with the characteristic feature corresponding to the address from which the codeword was read, and in which the predetermined criterion is that the speaker who shall be deemed to be recognised shall be the one whose counter has the highest count.

16. An apparatus according to claim 15 in which the predetermined criterion includes the requirement that identification shall not be deemed to have occurred unless the said highest count exceeds the counts of the other counters by a set margin.

17. An apparatus according to claim 15 in which predetermined criterion includes the requirement that identification shall not be deemed to have occurred unless the said highest count exceeds a threshold value.

18. An apparatus according to claim 17 in which the control means contains a further counter, is responsive to the occurrence of a codeword indicating a low probability of any known speaker to increment the further counter, and is responsive to the content of the further counter to adjust the said threshold value.

* * * * *